T. Carpenter,
Steam Cut-Off.
No. 1,532. Reissued Sep. 1, 1863.
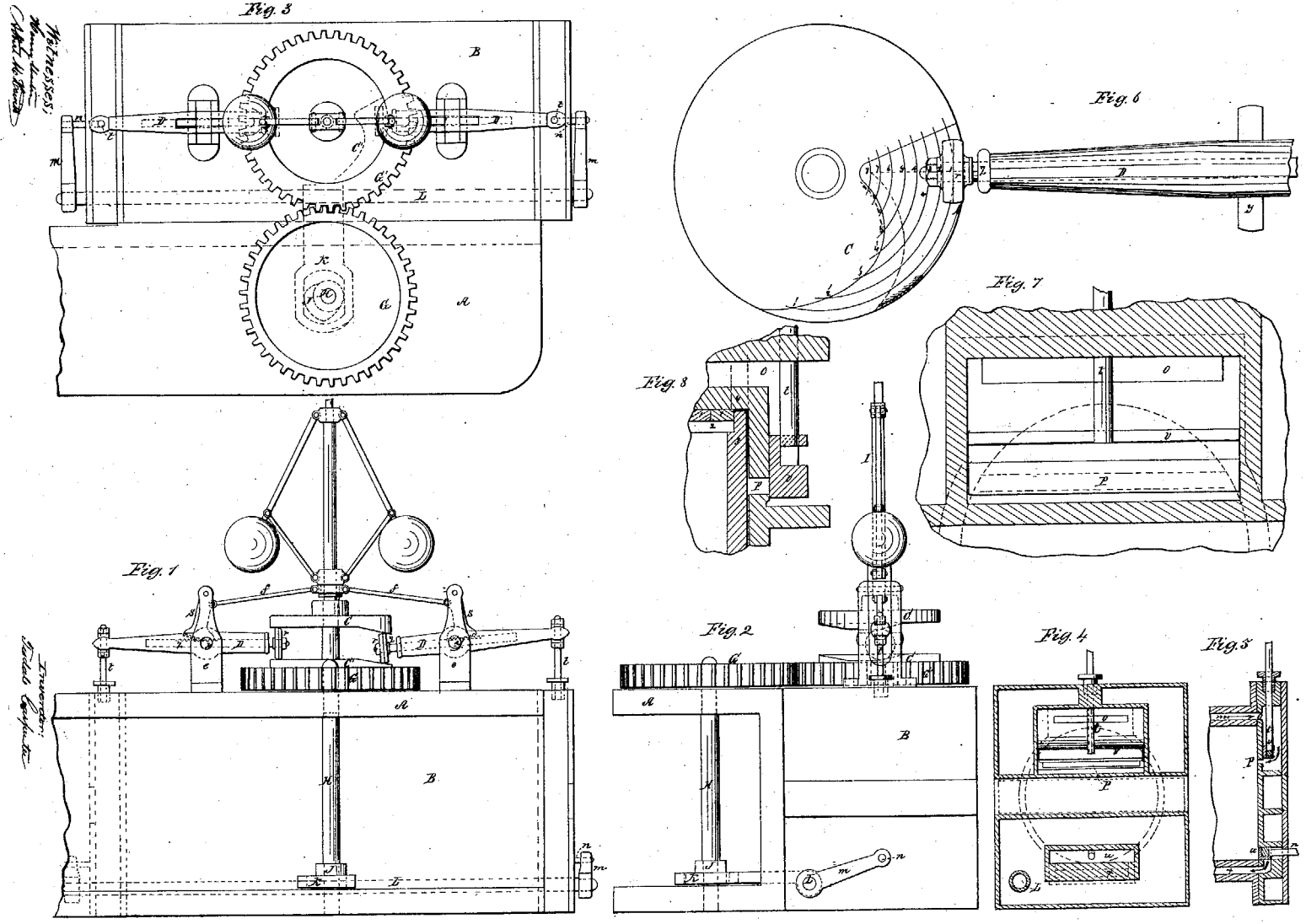
AM. PHOTO-LITHO. CO. N.Y. (OSBORNE'S PROCESS.)

UNITED STATES PATENT OFFICE.

TISDALE CARPENTER, OF PROVIDENCE, RHODE ISLAND.

IMPROVEMENT IN STEAM-ENGINES.

Specification forming part of Letters Patent No. 31,226, dated January 29, 1861; Reissue No. 1,532, dated September 1, 1863.

*To all whom it may concern:*

Be it known that I, TISDALE CARPENTER, of the city of Providence, in the county of Providence and State of Rhode Island, have invented certain new and useful Improvements in Steam and other Engines; and I do hereby declare that the following is a full, clear, and exact description of the same, reference being had to the accompanying drawings, making a part of this specification, in which—

Figure 1 is a side elevation of the cylinder of a horizontal engine, including that portion of the bed-piece to which it is attached, with the regulator and valve-gear in the positions they occupy when the engine is at rest. Fig. 2 is an end elevation of the same in a similar condition. Fig. 3 is a plan view of the same. Fig. 4 is an end view of the cylinder-head with the bonnets removed to expose the valves and their seats to view. Fig. 5 is a central vertical section of the cylinder-head and a portion of the cylinder, showing the valves and passages and the direction of the steam in its ingress and egress to and from the cylinder. Fig. 6 is a plan view on a larger scale than the before-mentioned figures of the lower half of the cam, by which the induction-valves are operated, and of part of one of the valve-operating levers. Fig. 7 is a vertical section parallel with, but on a scale larger than Fig. 4, of the steam-valve and its surroundings. Fig. 8 is a transverse section corresponding with Fig. 7.

Similar letters of reference indicate corresponding parts in the several figures.

This invention consists in regulating the velocity of a steam or other engine by combining the regulator with the induction-valves by means of a valve-gear which is positively connected both with the regulator and with said valves in such a manner as to be capable of producing, under the control of the regulator, a variable closing movement of the said valves without detaching or disconnecting them or any portion of the mechanism of the valve-gear, and without the use of any independent power to close the said valves.

It also consists in a novel valve-gear for producing a positive opening and closing movement of the induction-valves and a variable closing movement thereof without detaching or releasing them, composed of a compound cam and rocking levers of variable length combined either with or without a governor; and it further consists in a peculiar arrangement of the exhaust-valves and of their chambers and ports within the cylinder-heads of the engine, whereby the capacity of the waste-space requiring to be filled with steam is reduced to a minimum.

To enable others skilled in the art to make and use my invention, I will proceed to describe its construction with reference to the drawings.

A is a portion of the frame or bed to which the working parts of the engine are attached.

B is the cylinder, represented as cased to prevent condensation.

C C′ is the compound cam by which the induction-valves are worked.

D D are the rocking-levers—two in number—to which the induction-valves are attached by the valve-stems *t t*. These levers are made tubular for the greater portion of their length, and fitted with sliding rods Z Z, carrying on their outer ends friction-rolls *r r*, placed thereon to avoid friction and wear on the cam C C′, the said rods Z Z constituting variable extensions of the said levers D D.

*e e* are standards carrying the rocking levers and trunnions *y y*, and also forming the support for the two small-toothed sectors *s s*, the teeth of which work into similar teeth upon the sliding rods Z Z, and which are connected by rods *f f* with the regulator in such a manner that as the regulator rises the sliding rods Z Z are moved out from the levers D D, and the rolls *r r* are brought nearer to the axis of the cam, and as the regulator falls a contrary effect is produced on the said rods and rolls. The cam C C′ is fast upon an upright shaft, I, which at the same time constitutes the spindle of the regulator, the lower end of the said shaft being stepped upon the top of the cylinder and a bearing being arranged for its upper end in any way that may be convenient, and the said shaft has fast upon its lower part a spur-gear, G′, gearing with a spur-gear, G, of equal size on the upper part of another upright shaft, H, which is intended to be geared in a suitable manner with the main shaft of the engine, that it and the governor, spindle, or cam-shaft I may each make the same number of revolutions that the main shaft does.

The said cam C C′ is formed of two disks of cast-iron the corresponding surfaces of which may be chilled or otherwise hardened to make them durable. The upper disk, C, has a projection, *c c**, on its under surface, the profile form of which is represented in Fig. 2 and the form of its base in Fig. 6 and in dotted outline in Fig. 3. The upper surface of lower disk, C, is made of a form the reverse of the under surface of the upper one—that is to say, opposite to the projection *c c** on the upper one there is a depression, *c′ c′**, of corresponding form in the lower one—the object being to arrange the corresponding parts so that, however irregular they may be, there will be just room enough for the free passage of the friction-rolls *r r* between any parts of their surfaces. The said cam rotates in the direction of the arrow shown on it in Figs. 3 and 6, and as it does so the descending inclinations *c* of the projection on the upper disk depresses the rolls *r r* alternately, and thereby raises the valve stems *t t* and opens the corresponding induction-valves, and the rising inclination *c′** of the depression in the lower disk raises the rolls *r r* alternately, and thereby depresses the valve-stems and closes their corresponding valves. This arrangement, it will be understood, produces a positive closing as well as opening motion of the valves, the object of which is to avoid using a weight or spring for that purpose, in which case the engine has to overcome the resistance arising from said weight or spring every time that it opens the valve, and, further, with some kinds of valves it insures their return to their seats without any slamming or injury in that respect, and never allows them to stick and leave the ports open when they ought to be closed, which will often happen with engines using weights or springs to close the induction-valves, unless great care is taken in adjusting the stuffing-boxes and other parts connected with the valves, as well as the difficulty arising from the variable pressure of steam in the boilers—as, for instance, a weight or spring that will close the valve under a pressure of fifty or sixty pounds per inch will not be able to do so if any accident should increase the pressure to eighty or ninety pounds, which leads to the objectionable practice of choking the steam in the induction-pipes of engines that work with such means of closing the valve.

I will draw a distinction here between this mode of opening and closing the valves and any one by which the valves working with a spring or weight may finally be closed with a positive motion at the end of the stroke, if they should fail to do so at the proper time for cutting off. In this mode the valves must necessarily close perfectly at the time for cutting off, be it early or late, or the pressure of the the steam, great or small, on the engine has only the force produced by the pressure of the steam upon the valves to overcome in opening them, while in the other case it has to overcome the same force, besides what is due to the weight or spring that is to produce the returning movement.

I will now describe the combined action of the sliding rods Z Z, with their rolls *r r*, and the cam C C′, by which the variation in the time of closing the valves and cutting off the steam is produced.

In the drawings, the regulator is shown in its lowest position corresponding with a state of rest, or when the engine is just starting and before it has arrived at its average speed.

It will be seen by reference to the figures that the roll *r*, belonging to the opening-valve—that is to say, the one to the right hand in the figures is near the outer circumference of the disks C C′, its point of contact being upon the line marked 1, in Fig. 6. Consequently, the valve will remain open until the disk has rotated far enough to bring the point marked 1′ in line with the roll which corresponds to about three-quarters of the stroke of the engine. This point may be varied at will in constructing the cam, so as to make the steam follow a greater or less part of the stroke when the engine is at its lowest speed, and as the speed increases and the regulator rises the latter will slide the rods Z Z out until the roll *r*, coming nearer and nearer the center of the disk, will continue closing the valve earlier and earlier as the points 2′ 3′ 4′ 5′ 6′ 7′ 8′ are reached, until the inequalities on the surface of the cam ceases, when it will revolve without moving the valves at all, and will consequently entirely cut off the supply of steam. As the rods slide toward the center of the cam, the point of contact of the rolls *r r* is carried farther from the trunnions Y, which are the fulcra of the rocking levers D D at every increase of the speed, so that the valve not only closes earlier in regard to the stroke, as the engine requires less steam, but when it begins to cut off short, it opens the valve a less distance, which has the effect of making the engine regulate itself with the throttle wide open, no matter how light the load or how high the pressure of steam.

I have described the working length of the rocking-levers as being varied by making one part—that is to say, the bar Z—to traverse in the other; but I do not limit myself to this mode of construction, as they may be made differently and produce the same result; or the rollers may be arranged to traverse on the levers.

In order to avoid the waste of steam in the ports and passages of the engine, and to enable the piston Y, Fig. 8, to approach as near as possible to the ends of the cylinder, and thereby obviate as far as possible the waste of steam in the cylinder itself by filling useless space, as is unavoidable when the parts are in the sides of the cylinder, I make the cylinder-heads M hollow, as shown in the sections, Figs. 4, 5, 7, and 8, and arrange both the induction-valve *v* and the eduction-valve *u* in separate chambers, M′ and M², formed in their respective heads, both valves being of the sliding kind. The induction-chamber M′ is supplied with steam through a passage, O, on the top of the cylinder with which the steam-pipe connects, and the said chamber communicates with the cylinder by a port, P, which is opened and closed by a valve, *v*, working perpendicular to the bore of the cylinder. The eduction-chamber $M^2$ is in direct communication with the cylinder, and, being only just large enough for the valve *u* to work within it in a direction parallel with the movement of the piston, involves no considerable waste of steam, and the said chamber communicates, by means of a port, *u′*, in the valve-seat at its bottom, with a passage, X, which is formed in the bottom of the cylinder to lead to the exhaust-pipe. The stem *n* of the said valve works through a stuffing-box in the outside of the cylinder-head, and the said valve opens and closes the port *u′* by a movement parallel with the bore of the cylinder and motion of the piston.

The two eduction-valves are operated by means of a cam, J, on the lower part of the shaft H, before mentioned. This cam works in the yoke *k*, formed upon or attached to a horizontal sliding rod, L, which works in suitable guides formed upon or attached to the lower part of the cylinder, and the said rod L carries at its ends arms *m m*, which are attached to the valve-stems *n n*.

The object of this arrangement of mechanism for operating the eduction-valves, and one object of the mode of arranging the said valves themselves is that the said valves are permitted to be opened very quickly at the proper time, to remain at rest with the ports wide open as long as possible, and then to be closed quickly again, and both valves, being attached to the same rod L, of course work in unison.

The advantages obtained by these arrangements over the common mode of applying and operating the valves with an eccentric are, first, that the valves are enabled to be opened and closed quicker, which allows a better egress to the steam; second, that the valve does not have to move so far, only requiring sufficient lap to insure against leakage; third, that it takes less power, because the valve is at rest a part of the time instead of being constantly in motion under steam-pressure; fourth, that the valve is moved at the time when the pressure upon it is least, so that it wears less upon its seat; fifth and last, that as the valve does not have to move so far, there is less space around it which has to be filled and so exhausted at every stroke of the engine. The cam C C′ and adjustable rocking levers can also be used as an adjustable cut-off on engines which have no regulator by simply using a binding-screw, or its equivalent, to hold the rods Z Z at any place in the levers D D at which the engineer may choose to set them.

The application of these devices are not confined to horizontal engines alone, but with slight modifications, which will suggest themselves to the skillful engineers, may be adapted to upright ones, or to engines having their valves applied in the usual manner, and in all cases they constitute a sensitive and perfectly-regulating automatic cut-off motion for the induction-valves of the engine without any liberating valve-gear or the use of any independent power to close the valves after having been opened by the power of the engine, using the power of the engine to both open and close the valves, and using a positive connection for both the regulator and the valves during the entire stroke of the engine.

What I claim as my invention, and desire to secure by Letters Patent, is—

1. Regulating the velocity of a steam-engine by connecting a regulator permanently or positively with the induction-valves by means of levers of variable length working between a pair of corresponding cam-disks and employed to close as well as open the valve in a positive manner, substantially as herein specified.

2. The cam C C′ and variable rocking levers D Z D Z, working between and controlled by said cams when used in combination with each other and with the induction-valves of a steam-engine, substantially as herein described, either in connection with a regulator to constitute an automatically variable cut-off gear or without a regulator to serve as an adjustable cut-off.

3. The arrangement of the eduction-valves and their chambers and ports in the cylinder-heads, substantially as and for the purpose herein specified.

TISDALE CARPENTER.

Witnesses:
HENRY MARTIN,
ALBERT M. HEWITT.